US006484254B1

United States Patent
Chowdhury et al.

(10) Patent No.: US 6,484,254 B1
(45) Date of Patent: Nov. 19, 2002

(54) METHOD, APPARATUS, AND SYSTEM FOR MAINTAINING PROCESSOR ORDERING BY CHECKING LOAD ADDRESSES OF UNRETIRED LOAD INSTRUCTIONS AGAINST SNOOPING STORE ADDRESSES

(75) Inventors: Muntaquim F. Chowdhury, Portland, OR (US); Douglas M. Carmean, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/475,922

(22) Filed: Dec. 30, 1999

(51) Int. Cl.⁷ .................................................. G06F 9/38
(52) U.S. Cl. ........................ 712/216; 712/23; 712/218; 712/225; 711/169
(58) Field of Search ........................ 712/23, 216, 218, 712/225; 711/169

(56) References Cited

U.S. PATENT DOCUMENTS 5,475,823 A * 12/1995 Amerson et al. ............ 711/169
5,748,937 A 5/1998 Abramson et al. .......... 712/218
5,751,986 A 5/1998 Fetterman et al. .......... 712/218
6,058,472 A * 5/2000 Panwar et al. .............. 712/218
6,182,210 B1 * 1/2001 Akkary et al. .............. 712/235

FOREIGN PATENT DOCUMENTS

WO        WO99/31594        6/1999

* cited by examiner

Primary Examiner—Kenneth S. Kim
(74) Attorney, Agent, or Firm—Blakely, Sokoloff, Taylor & Zafman LLP

(57) ABSTRACT

According to one aspect of the invention, a method is provided in which store addresses of store instructions dispatched during a last predetermined number of cycles are maintained in a first data structure of a first processor. It is determined whether a load address of a first load instruction matches one of the store addresses in the first data structure. The first load instruction is replayed if the load address of the first load instruction matches one of the store addresses in the first data structure.

30 Claims, 10 Drawing Sheets

| T1 | T2 | T3 |
|---|---|---|
| STORE X AT LOCATION 1000 | LOAD FROM LOCATION 1000 | STORE Z IN LOCATION 1000 |
| STORE Y AT LOCATION 1000 | LOAD FROM LOCATION 1000 | |
| | LOAD FROM LOCATION 1000 | |
| | | |
| | | |

METHOD, APPARATUS, AND SYSTEM FOR MAINTAINING PROCESSOR ORDERING BY CHECKING LOAD ADDRESSES OF UNRETIRED LOAD INSTRUCTIONS AGAINST SNOOPING STORE ADDRESSES

BACKGROUND OF THE INVENTION

1. Field of the Invention

The present invention relates generally to the field of processor technology. More specifically, the present invention relates to a method and apparatus for maintaining processor ordering in a processor.

2. Background Information

Various multithreaded processors and multi-processor systems have been considered in recent times to further improve the performance of processors, especially to provide for a more effective utilization of various processor resources and to speed up the performance of the overall system. In a multithreaded processor, by executing multiple threads in parallel, the various processor resources are more fully utilized which in turn enhance the overall performance of the respective processor. For example, if some of the processor resources are idle due to a stall condition or other delay associated with the execution of a particular thread, these resources can be utilized to process another thread. Consequently, without multithreading capabilities, various available resources within the processor would have been idle due to a long-latency operation, for example, a memory access operation to retrieve the necessary data from main memory that is needed to resolve the cache miss condition. In a multi-processor systems, tasks or workloads can be distributed among the various processors to reduce the workload on each processor in the system and to take advantage of the parallelism structure that may exist in certain programs and applications, which in turn improves the overall performance of the system. For example, a program or an application may contain two or more processes (also referred to as threads herein) that can be executed concurrently. In this instance, instead of running the entire program or application on one processor, the two or more processes can be run separately and concurrently on the various processors in the multi-processor system which will result in faster response time and better overall performance.

Multithreaded processors may generally be classified into two broad categories, fine or coarse designs, based upon the particular thread interleaving or switching scheme employed within the respective processor. In general, fine multithreaded designs support multiple active threads within a processor and typically interleave two different threads on a cycle-by-cycle basis. Coarse multithreaded designs, on the other hand, typically interleave the instructions of different threads on the occurrence of some long-latency event, such as a cache miss. A coarse multithreaded design is discussed in Eickmayer, R., Johnson, R. et al. "Evaluation of Multi-threaded Uniprocessors for Commercial Application Environments", *The 23rd Annual International Symposium on Computer Architecture*, pp. 203–212, May 1996. The distinctions between fine and coarse designs are further discussed in Laudon, J., Gupta, A. "Architectural and Implementation Tradeoffs in the Design of Multiple-Context Processors", *Multithreaded Computer Architectures: A Summary of the State of the Art,* edited by R. A. Iannuci et al., pp. 167–200, Kluwer Academic Publishers, Norwell, Mass., 1994.

While multithreaded processors and multi-processor systems offer advantages over single-threaded processor and single-processor systems, respectively, there are certain challenges and issues associated with the design and implementation of these systems. There are some particular issues that arise with respect to the concept of multithreading and multithreaded processor design, especially with respect to the parallel or concurrent execution of instructions. One of the difficult issues that arise in connection with multithreading and/or multiprocessing systems is the coordination and synchronization of memory accesses by the different threads in a multithreaded and/or multi-processor environment. In particular, it is a complex problem to maintain processor ordering or memory ordering among the different threads and/or different processors in a processing system in which the different threads and/or different processors share a common memory. In this situation, the various threads and/or processors communicate using data or variables in a shared memory via various memory access instructions or commands such reads (loads) and writes (stores). Processor ordering or memory ordering is an important aspect of a multithreaded processor and/or a multi-processor system. Processor ordering or memory ordering refers to the ability of a system to perform or execute memory instructions correctly. Processor ordering or memory ordering is maintained properly if the value or data obtained by a read (load) instruction from a particular memory location is the same value that was written to (stored in) that particular memory location by the most recent write (store) instruction. Likewise, processor or memory ordering requires that an older load instruction cannot get data which is newer than the data obtained by a younger load instruction. The problem is further complicated by the fact that each of the processor in the system may execute both instruction and/or data speculatively and out-of-order. For example, assuming a program contains two store instructions and two load instructions in the following logical sequence order (the original program order):

Store 1: Store 100 X(store the value X in memory location 1000)

Load 1: Load 1000 (read the value stored at memory location 1000)

Store 2: Store 1000 Y (store the value Y in memory location 1000)

Load 2: Load 1000 (read the value stored at memory location 1000)

It can be appreciated that maintaining processor or memory ordering with respect to the four instructions in this example is not an easy task, considering that these four instructions may be executed speculatively out-of-order in multiple threads on multiple processors. Depending on the order in which these four instructions are executed, the results may or may not violate the processor or memory ordering rule.

SUMMARY OF THE INVENTION

According to one aspect of the invention, a method is provided in which store addresses of store instructions dispatched during a last predetermined number of cycles are maintained in a first data structure of a first processor. It is determined whether a load address of a first load instruction matches one of the store addresses in the first data structure. The first load instruction is replayed if the load address of the first load instruction matches one of the store addresses in the first data structure.

BRIEF DESCRIPTION OF THE DRAWINGS

The features and advantages of the present invention will be more fully understood by reference to the accompanying drawings, in which.

DETAILED DESCRIPTION

In the following detailed description numerous specific details are set forth in order to provide a thorough understanding of the present invention. However, it will be appreciated by one skilled in the art that the present invention may be practiced without these specific details.

In the discussion below, the teachings of the present invention are utilized to implement a method, an apparatus, and a system for maintaining processor or memory ordering in a multithreaded and/or multiprocessor system environment in which one or more processors may execute instructions and/or data speculatively. In one embodiment, a cross-thread snooping operation is performed to determine whether a store address of a store instruction being executed in a first thread of a first processor matches a load address of a load instruction in a second thread of the first processor that has been completed but not yet retired. If the store address of the store instruction being executed in the first thread matches the load address of the load instruction in the second thread, a signal is generated which causes speculative load instructions to be cleared and reissued in order to avoid processor ordering violation. In one embodiment, an external snooping operation is also performed to determine whether a store address of a store instruction being executed by a second processor matches a load address of a load instruction in the first processor that has been completed but not yet retired. If there is a match, a signal is generated which causes speculative load instructions in the first processor to be cleared and reissued in order to avoid processor ordering violation. In one embodiment, the store address of the store instruction obtained from either the cross-thread snooping or the external snooping operation is stored in a data structure. A load address of a load instruction being executed in the first processor is compared with the store addresses in the data structure. If there is a match, the respective load instruction is replayed to avoid processor ordering violation. The teachings of the present invention are applicable to any multithreaded processor and/or multi-processor system that is designed to process multiple threads or multiple processes concurrently. However, the present invention is not limited to multithreaded processors and/or multiprocessor systems and can be applied to any processor and machine in which resources are shared between tasks or processes.

Figures 1, 2:
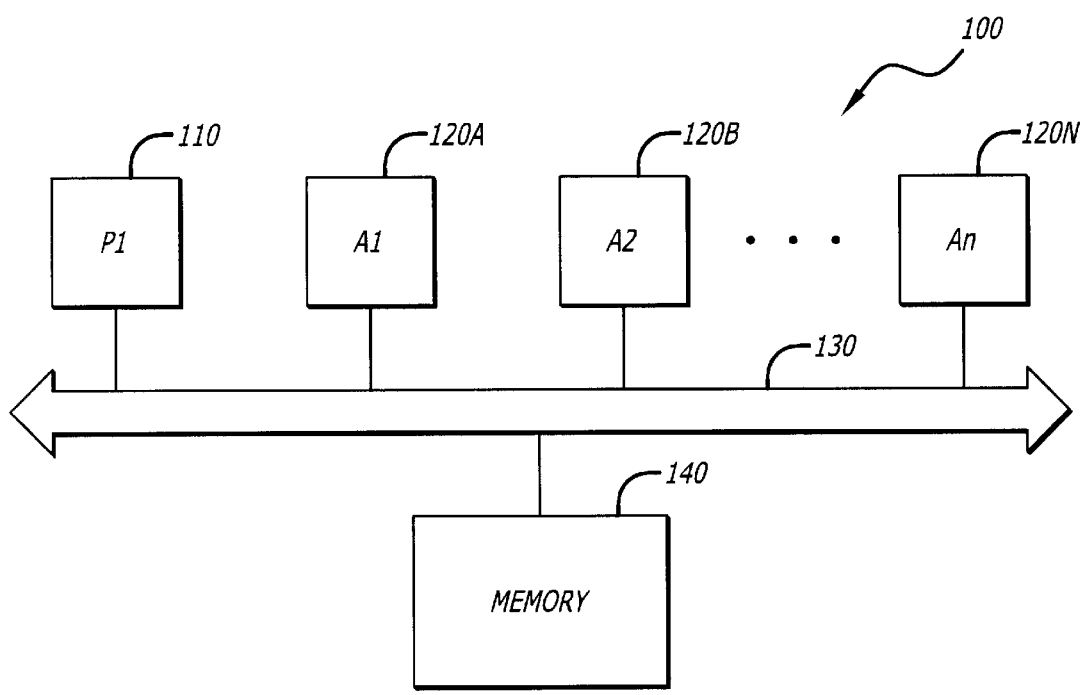
FIG. 1 shows a block diagram of one embodiment of a multi-processor system in which a common memory is shared between multiple processors.
FIG. 2 illustrates an example of a processor or memory ordering problem.

FIG. 1 shows a block diagram of one embodiment of a system 100 in which the teachings of the present invention are implemented. The system 100 includes a processor 110 that is capable of multithreading and executing instructions and/or data speculatively, one or more agents 120A–N, a system bus 130, and a memory 140. The processor 110, the agents 120A–N and the memory 140 are coupled to the system bus 130. Agents 120A–N may include other general purpose processors that may also be capable of multithreading and executing instructions and/or data speculatively, and/or other well-know devices such as disk controllers, graphics controllers, special purpose processors, etc. In this configuration, the processor 110 and the agents 120A–N, in this example, can access the common memory 140 concurrently via the system bus 130. Accessing the memory 140 may include executing read (load) and write (store) instructions. Maintaining processor or memory ordering in this system configuration is a complex problem since the processor 110 can execute instructions from multiple threads concurrently. The problem is further complicated because the processor 110 can also speculatively execute instructions and/or data within each thread. The problem is further compounded when one of the agents (e.g., 120A) is a processor that is capable of multithreading and may execute instructions and/or data speculatively. In this situation, not only that processor or memory ordering needs to be maintained as between the different threads being executed concurrently within one processor (e.g., processor 110), processor or memory ordering needs to be maintained also as between the multiple processors (e.g., processor 110 and agent 120A) which share the same common memory, i.e., the memory 140. Depending on the order in which instructions from the multiple threads are being executed in one processor and the order in which the instructions are being executed in the multiple processors, there can be many different combinations of execution sequences which may yield different and unpredictable results. As such, there is a need for some mechanisms to maintain the processor or memory ordering as between the multiple threads in one processor (e.g., processor 110) and also as between the multiple processors in the system (e.g., processor 110 and agent 120A).

FIG. 2 illustrates an example of processor or memory ordering problem that can arise in the system configuration shown in FIG. 1. In this example, assuming that there are two threads (T1 and T2) that are executed concurrently by P1 (processor 110) and that another thread (T3) is executed by P2 (e.g., agent 120A) concurrently with T1 and T2. As shown in FIG. 2, T1 includes two store instructions: "store X" at memory location 1000 followed by "store Y" at the same memory location 1000. T2 includes three successive load instructions (L1, L2, and L3) that read from the same memory location 1000. T3 includes one store instruction to store a value Z in the memory location 1000. Assuming that the logical sequence order of the instructions in these three threads are as follows:

1. Store X in memory location 1000

2. Load from memory location 1000
3. Store Y in memory location 1000
4. Load from memory location 1000
5. Store Z in memory location 1000
6. Load from memory location 1000

As mentioned above, in a shared memory configuration as shown in FIG. 1, the results obtained in executing the instructions in the three threads can be very different depending upon the order in which the various instructions in the multiple threads are executed. For example, either load instruction executed by P1 can occur either before or after any store instruction being performed by either P1 or P2. In this case, the first load instruction (L1) may return either X, Y, or Z. Similarly, the second load (L2) or the third load (L3) may also return uncertain result depending on the order in which the different instructions are executed by P1 and P2. As described in detail below, the present invention provides a mechanism to maintain processor or memory ordering that is designed to solve the problem of processor ordering in a system configuration (e.g., system 100) in which multiple threads can be processed concurrently by one or more processors that may execute instructions and/or data in each thread speculatively and out-of-order.

Figure 3:
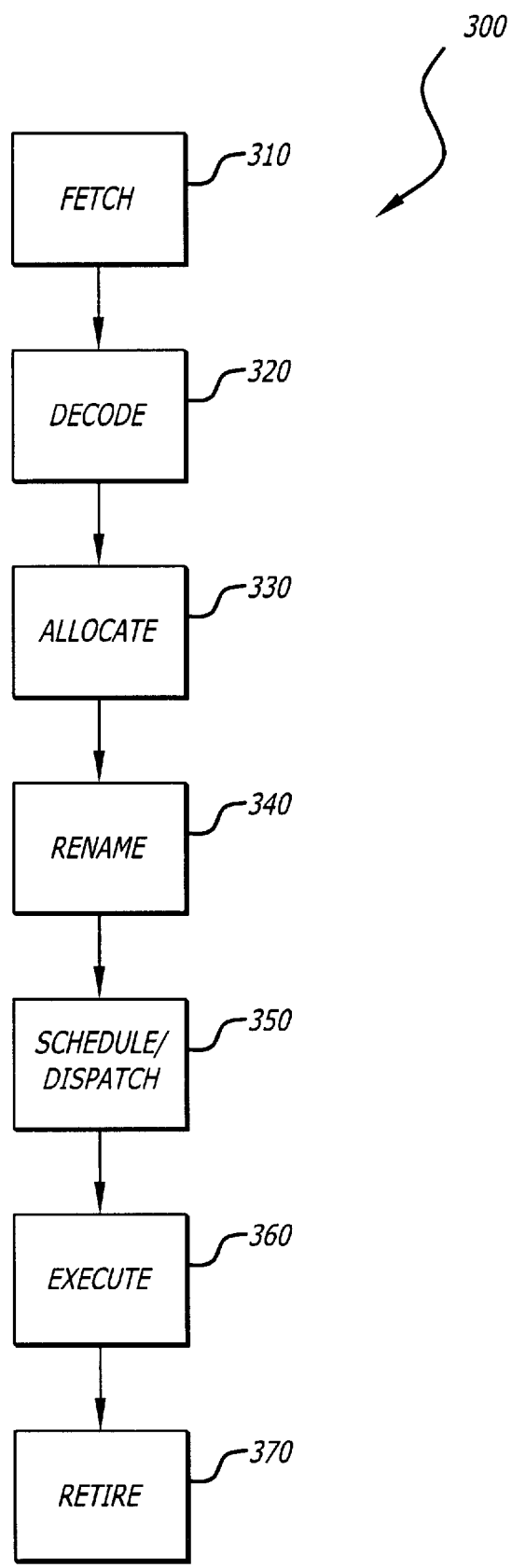
FIG. 3 is a block diagram of one embodiment of a processor pipeline in which the teachings of the present invention are implemented.

FIG. 3 is a block diagram of one embodiment of a processor pipeline within which the present invention may be implemented. For the purposes of the present specification, the term "processor" refers to any machine that is capable of executing a sequence of instructions and shall be taken to include, but not be limited to, general purpose microprocessors, special purpose microprocessors, graphics controller, audio processors, video processors, multi-media controllers and microcontrollers. The processor pipeline 300 includes various processing stages beginning with a fetch stage 310. At this stage, instructions are retrieved and fed into the pipeline 300. For example, a macroinstruction may be retrieved from a cache memory that is integral within the processor or closely associated therewith, or may be retrieved from an external memory unit via a system bus. The instructions retrieved at the fetch stage 310 are then fed into a decode stage 320 where the instructions or macroinstructions are decoded into microinstructions or micro-operations for execution by the processor. At an allocate stage 330, processor resources necessary for the execution of the microinstructions are allocated. The next stage in the pipeline is a rename stage 340 where references to external registers are converted into internal register references to eliminate dependencies caused by register reuse. At a schedule/dispatch stage 350, each microinstruction is scheduled and dispatched to an execution unit. The microinstructions are then executed at an execute stage 360. After execution, the microinstructions are then retired at a retire stage 370.

In one embodiment, the various stages described above can be organized into three phases. The first phase can be referred to as an in-order front end including the fetch stage 310, decode stage 320, and allocate stage 330, and rename stage 340. During the in-order front end phase, the instructions proceed through the pipeline 300 in their original program order. The second phase can be referred to as the out-of-order execution phase including the schedule/dispatch stage 350 and the execute stage 360. During this phase, each instruction may be scheduled, dispatched and executed as soon as its data dependencies are resolved and the appropriate execution unit is available, regardless of its sequential position in the original program. The third phase, referred to as the in-order retirement phase which includes the retire stage 370 in which instructions are retired in their original, sequential program order to preserve the integrity and semantics of the program.

Figure 4:
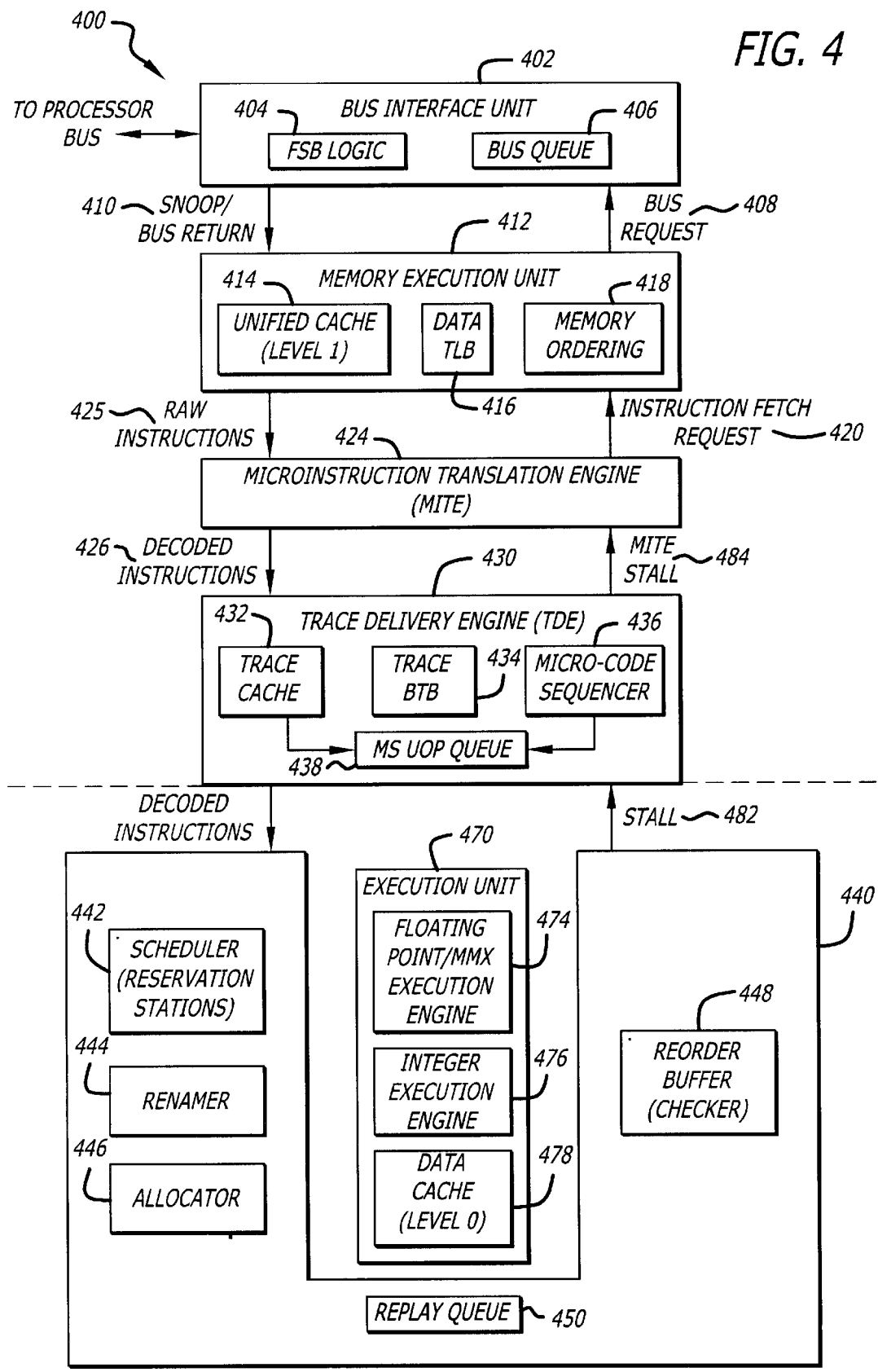
FIG. 4 shows a block diagram of one embodiment of a processor architecture in which the teachings of present invention are implemented.

FIG. 4 is a block diagram of one embodiment of a processor, in the form of a general-purpose microprocessor 400, in which the present invention may be implemented. The microprocessor 400 described below is a multithreaded (MT) processor and capable of processing multiple instruction threads simultaneously. However, the teachings of the present invention described below are fully applicable to other processors that process multiple instruction threads in an interleaved manner and also to single thread processors which have the capabilities to process multiple instructions either in parallel or in an interleaved manner. In one embodiment, the microprocessor 400 may be an Intel Architecture (IA) microprocessor that is capable of executing an Intel Architecture instruction set.

The microprocessor 400 comprises an in-order front end, an out-of-order execution core and an in-order retirement back end. The in-order front end includes a bus interface unit 402 which functions as an interface between the microprocessor 400 and other components (e.g., main memory unit) of a computer system within which the microprocessor 400 may be implemented. The bus interface unit 402 couples the microprocessor 400 to a processor bus (not shown) via which data and control information are transferred between the microprocessor 200 and other system components (not shown). The bus interface unit 400 includes a Front Side Bus (FSB) 404 that controls and facilitates communications over the processor bus. The bus interface unit 402 also includes a bus queue 406 that is used to provide a buffering function with respect to the communications over the processor bus. The bus interface unit 402 receives bus requests 408 from a memory execution unit 412. The bus interface unit 402 also sends snoops or bus returns to the memory execution unit 412.

The memory execution unit 412 (also referred to as the memory subsystem herein) is structured and configured to function as a local memory within the microprocessor 400. The memory execution unit 412 includes a unified data and instruction cache 414, a data Translation Lookaside Buffer (TLB) 416, and a memory ordering logic 418. The memory execution unit 412 receives instruction fetch requests 420 from a microinstruction translation engine (MITE) 424 and provides raw instructions 425 to the MITE 424. The MITE 424 decodes the raw instructions 425 received from the memory execution unit 412 into a corresponding set of microinstructions, also referred to as micro-operations or UOPs. Decoded microinstructions 426 are sent by the MITE 424 to a trace delivery engine (TDE) 430.

The trace delivery engine 430 functions as a microinstruction cache and is the primary source of microinstructions for a downstream execution unit 470. The trace delivery engine 430 includes a trace cache 432, a trace branch predictor (BTB) 434, a micro-code sequencer 436, and a micro-op (uop) queue 438. By having a microinstruction caching function within the processor pipeline, the trace delivery engine 430 and specifically the trace cache 432 can leverage the work done by the MITE 424 to provide a relatively high microinstruction bandwidth. In one embodiment, the trace cache 432 may comprise a 256 entry, 8 way set associate memory. The term "trace", in one embodiment, refers to a sequence of microinstructions stored within the entries of the trace cache 432 with each entry having pointers to preceding and proceeding microinstructions in the trace. Therefore, the trace cache 432 can facilitate high-performance sequencing in that the address of the next entry to be accessed to obtain a subsequent microinstruction is known before a current access is completed. The trace cache branch predictor 434 provides local branch predictions with respect to traces within the trace cache 432. The trace cache 432 and the microcode sequencer 436 provide microinstructions to the micro-op queue 438.

The microinstructions are then fed from the micro-op queue 438 to a cluster that includes a scheduler 442, a register renamer 444, an allocator 446, a reorder buffer 448 and a replay queue 450. The scheduler 442 includes a set of reservation stations and operates to schedule and dispatch microinstructions for execution to the execution unit 470. The register renamer 444 converts references to external registers into internal register references to remove dependencies caused by register reuse. The allocator 446 operates to allocate resources that are required for the execution of the microinstructions. In the event that the required resources are insufficient or unavailable to process a microinstruction or a set of microinstructions, the allocator 446 will assert a stall signal 482 that is propagated to the trace delivery engine 430 and the microinstruction translation engine 424. The replay queue 450 is used to store and provide those microinstructions that need to be re-executed (replayed) to the execution unit 470. The reorder buffer 448 is used to store the microinstructions in their original, sequential program order. When the microinstructions stored in the reorder buffer 448 have completed execution and are ready for retirement, they are removed from the reorder buffer in their original, sequential program order.

The execution unit 470 includes a floating point execution engine 474, an integer execution engine 476, and a level 0 data cache 478. In one embodiment in which the microprocessor 400 executes the IA instruction set, the floating point execution engine 274 may also execute MMX® instructions.

Figure 5:
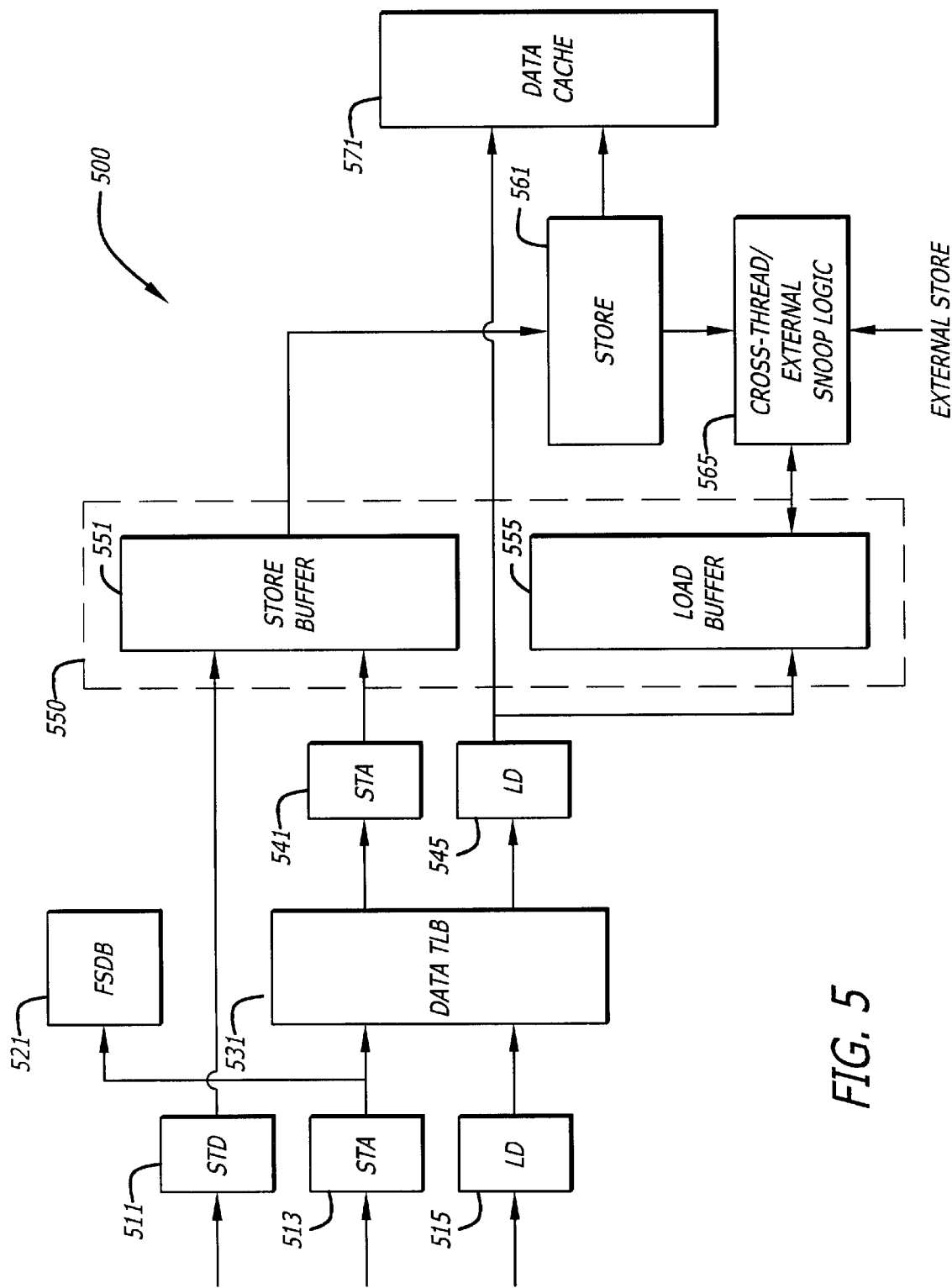
FIG. 5 shows a block diagram of one embodiment of a memory execution unit according to the teachings of the present invention.

FIG. 5 shows a block diagram of one embodiment 500 of the memory execution unit 412 according to the teachings of the present invention. In this embodiment, the memory execution unit 500 is responsible for servicing various types of memory access instructions (UOPs) including read (load) and write (store) instructions. In one embodiment, the memory execution unit 500 receives memory dispatches (e.g., memory reads (loads) and writes (stores)) from the scheduler/dispatcher 442. As described above, the scheduler/dispatcher 442 includes a set of reservation stations (RS) and operates to schedule and dispatch UOPs for execution to the execution unit 470 and the memory execution unit 500. The memory execution unit 500, in one embodiment, receives memory dispatches (e.g., LOAD and STORE UOPs), processes these memory dispatches and returns data and fault information back to the RS and other units including the ROB 448. In one embodiment, the memory execution unit 500, upon receiving a memory read instruction (LOAD UOP), may issue a request to read data from an external memory (i.e., the memory 140 in FIG. 1) via the bus interface unit 402. In one embodiment, upon receiving a memory WRITE instruction (STORE UOP), the memory execution unit 500 may issue a write request to write data to the memory 140 or another unit (e.g., I/O device or agent) coupled to the processor 400 via the bus interface unit 402.

As shown in FIG. 5, the memory execution unit 500 includes a memory order buffer (MOB) 550 that is used to control the memory dispatching within the memory execution unit 500. The MOB 550, in one embodiment, includes a store buffer 551 and a load buffer 555 that are used to store the STORE and LOAD UOPs that are dispatched from the scheduler/dispatcher unit 442. The store buffer 551 and the load buffer 555 are also used to keep track of the progress of the dispatched STORE and LOAD UOPs until they are retired. In one embodiment, the STORE buffer 551 contains 24 entries and the LOAD buffer 555 contains 48 entries. In this embodiment, the MOB 550 is responsible for enforcing memory ordering, as describe in detail below. The memory execution unit 500 further includes a data translation lookaside buffer (DLTB) 531 that is used to translate the linear addresses of the load and store UOPs into physical addresses. In one embodiment, the DTLB includes a small page array and a large page array. In one embodiment, the small page array contains 64 entries for 4 KB pages and the large page array contains 8 entries for 4 MB pages. The memory execution unit 500 also includes a data cache unit (also referred to as level 0 or L0 data cache) 571. In one embodiment, the L0 data cache 571 includes an 8 KB, 4-way set associative data array with 64-byte cache line. In one embodiment, the memory execution unit 500 further includes a page miss handler (PMH) (not shown in FIG. 4). The PMH is responsible for servicing page misses for the DLTB 531. It also handles splits and TLB reloading.

Continuing with the present discussion, as explained above, the memory execution unit 500 receives load and store UOPs dispatched from the scheduler/dispatcher 442. In the present embodiment, store instructions are decoded into two UOPs: a store address UOP (STA), illustrated by block 511 and a store data UOP (STD), illustrated by block 513. Load instructions are decoded into one UOP (LD), shown as block 515. As described above, the store buffer 551 and the load buffer 555 are used to keep track of store and load UOPs dispatched by the scheduler/dispatcher 442. The store data UOPs 511 are delivered directly to the store buffer 551. The store address UOPs 513 and load UOPs are delivered to the DTLB 531 which translates the linear addresses associated with these respective UOPs into their corresponding physical addresses, as illustrated by blocks 541 and 545. The physical store address UOPs 541 are delivered to the store buffer 551. The physical load address UOPs 545 are delivered to data cache unit 571 and the load buffer 555.

As shown in FIG. 5, the memory execution unit 500 also includes a forwarding store data buffer (FSDB) 521 that is used to store data and address associated with store UOPs 511 and 513. In the present embodiment, the memory execution unit 500 is responsible for issuing a full store dispatch, illustrated as block 561, to store data into the data cache unit 571, when both store address and store data UOPs have been dispatched and are ready for full execution.

The memory execution unit 500 further includes an ordering mechanism or logic 565 that is used to maintain processor or memory ordering in the present embodiment. In one embodiment, to ensure that memory operations are executed correctly, the ordering logic 565, in response to a detection of either a full store dispatch at block 561 or an external store operation present on the bus 130, snoops the load buffer 555 to compare the address of the detected store dispatch with the addresses in the load buffer. In one embodiment, the ordering logic 565 compares the address of the store dispatch (either the full store in the first processor or the external store from the other agent) to addresses of all load UOPs that have been completed but not yet retired. If a match is found, then a processor ordering violation is indicated for the respective load instruction for which the match is found. In one embodiment, the processor ordering violation is indicated for the respective load instruction by flagging an appropriate field in the matching entry in the load buffer to indicate a snoop hit. If a processor ordering violation is indicated, a signal referred to as NUKE or CRNUKE is generated which causes the respective load and subsequent speculatively executed UOPs to be aborted (cleared) and reissued in order to avoid processor ordering violation. In one embodiment, each entry in the load buffer includes a status field to indicate the current progress or status of the respective load. In one embodiment, as shown in FIG. 5, the ordering logic 555 includes a cross-thread snoop logic that supports cross-thread snooping of stores in one thread against completed loads in another thread. As described above, the first processor is capable of executing a first thread and a second thread concurrently. When both the first thread and the second thread are being executed concurrently, the processor is said to operate in a multi-threading (MT) mode. In MT mode, the addresses of the load UOPs from both the first and second threads are stored in their respective portions in the load buffer. When a full store dispatch from one of the two threads is detected, the cross-thread snoop logic snoops the load buffer to compare the address of the full store dispatch from one thread against all completed loads from the other thread that have not yet been retired. In one embodiment, the cross-thread snoop logic compares the address of the full store dispatch from either thread (thread 1 or thread 0) to the addresses of the load instructions in the other thread in the load buffer whose corresponding status field has been set to "completed". If a match is found, then the corresponding entry in the load buffer is flagged accordingly to indicate a processor ordering violation.

In the present embodiment, to maintain processor or memory ordering as between the first processor and another processor (e.g., agent A1) that share the common memory 140, the ordering logic 565 also includes an external snooping mechanism to maintain processor ordering in this multiprocessor (MP) environment. The external snooping mechanism, in response to a store instruction being detected on the bus 130, compares the address of the respective store instruction to the addresses of load UOPs in the load buffer that have been completed but not yet retired. If a match is found, the corresponding load buffer entry is flagged accordingly to indicate a processor ordering violation.

In one embodiment, snooping of the load buffer is implemented in the physical address domain at cache-line granularity. Loads that split across a line boundary are snooped with decremented physical address. In one embodiment, a load is considered bound to data if the "physical address valid" bit is set for that load in the load buffer. This bit will be changed to a "complete" bit to indicate that the load has gone replay-safe. If either the cross-thread snoop and the external snoop of the load buffer results in at least one "hit" in the load buffer, the MOB will generate an appropriate signal to the ROB to request the ROB to abort the speculative state of the machine and restart from the aborted load. In one embodiment, in response to a "nuke" request from the MOB, the ROB will assert a "nuke" signal on the first eligible load that it tries to retire. This will cause all instructions that have not yet been retired to be cleared and reissued in order to avoid processor ordering violation. In one embodiment, there is no synchronization between the load(s) that were hit by the snoop and the retirement point when the nuke signal is asserted because of the transition delay between the MOB and the ROB.

Figure 6:
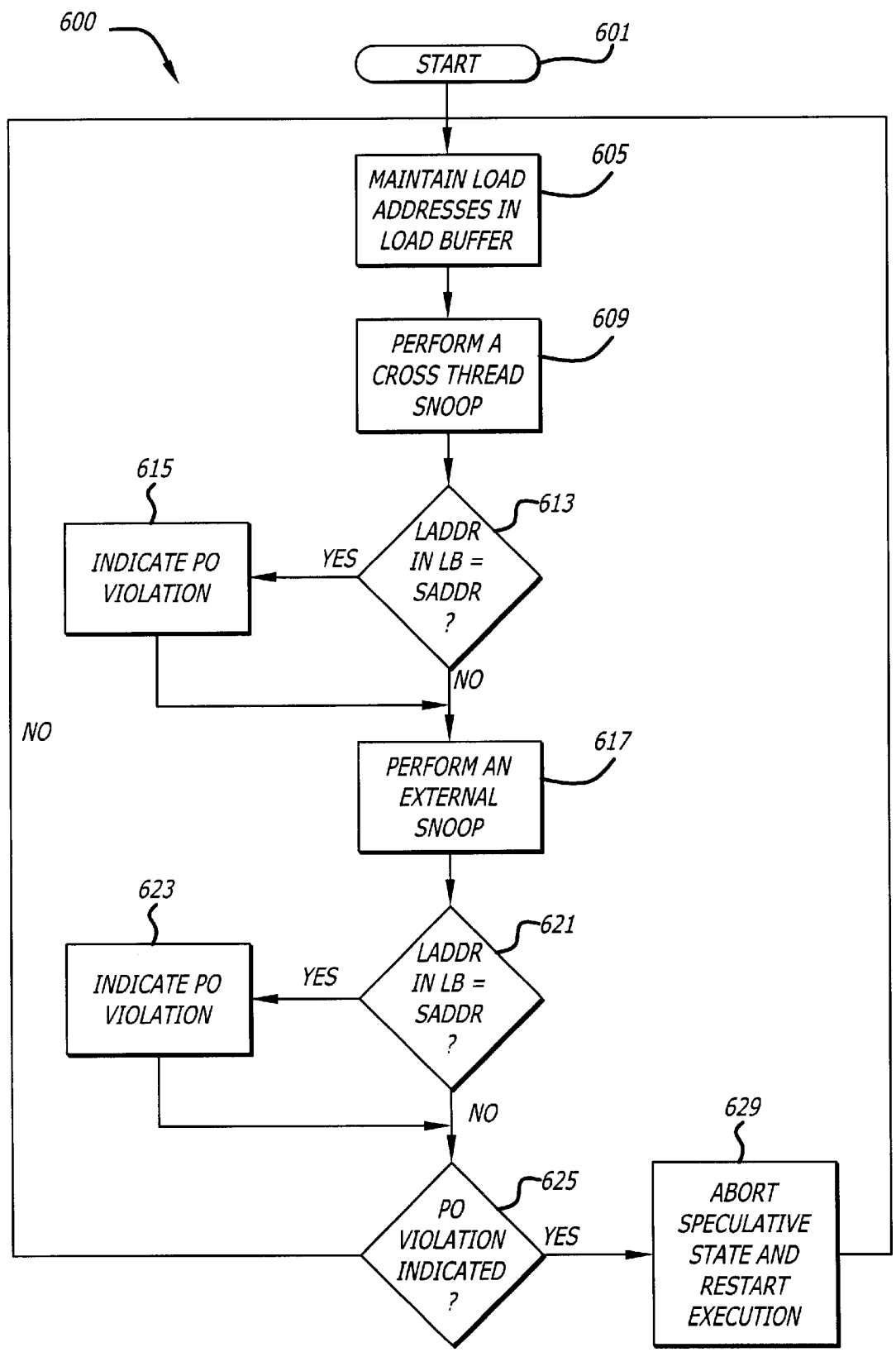
FIG. 6 illustrates a flow diagram of one embodiment of a method for maintaining processor or memory ordering according to one aspect of the present invention.

FIG. 6 shows a flow diagram of one embodiment of a method 600 for maintaining processor or memory ordering according to one aspect of the present invention. The method 600 starts at block 601 and proceeds to block 605. At block 605, load addresses and other pertinent information of load UOPs that have been dispatched but not yet retired are maintained in a load buffer of a first processor. As described above, an entry in the load buffer is allocated for each UOP dispatched from the scheduler/dispatcher. As the load UOP proceeds through the pipeline of the first processor, other relevant information with respect to the load UOP is also updated accordingly in the load buffer. For example, a load buffer entry allocated for a dispatched load UOP also includes a status field that is used to indicate whether the respective load UOP has been bound to data, whether the respective UOP has been completed or being replayed, etc. At block 609, in response to a detection of a full store dispatch from one thread (as shown in FIG. 5), a cross-thread snooping operation is performed to compare the address of the full store dispatch from one thread to load addresses of the load UOPs from the other thread that have been completed but not yet retired. At decision block 613, if a match is found, the method 600 proceeds to block 615 to indicate a processor ordering violation (i.e., a snoop hit). Otherwise, the method 600 proceeds to block 617. At block 617, in response to a detection of an external store instruction on the bus (e.g., a store instruction from a second processor), an external snooping operation is performed to compare the address of the external store instruction to addresses of all load UOPs in the load buffer that have been completed but not yet retired. At decision block 621, if a match is found, the method 600 proceeds to block 623 to indicate a processor ordering violation (i.e., a snoop hit). Otherwise the method 600 proceeds to block 625. At block 625, the method 600 proceeds to block 629 if a processor ordering violation has been indicated. Otherwise the method 600 loops back to block 605. At block 629, the speculative state of the first processor is aborted and the first processor is restarted from the respective load for which the snoop hit is indicated.

Figure 7:
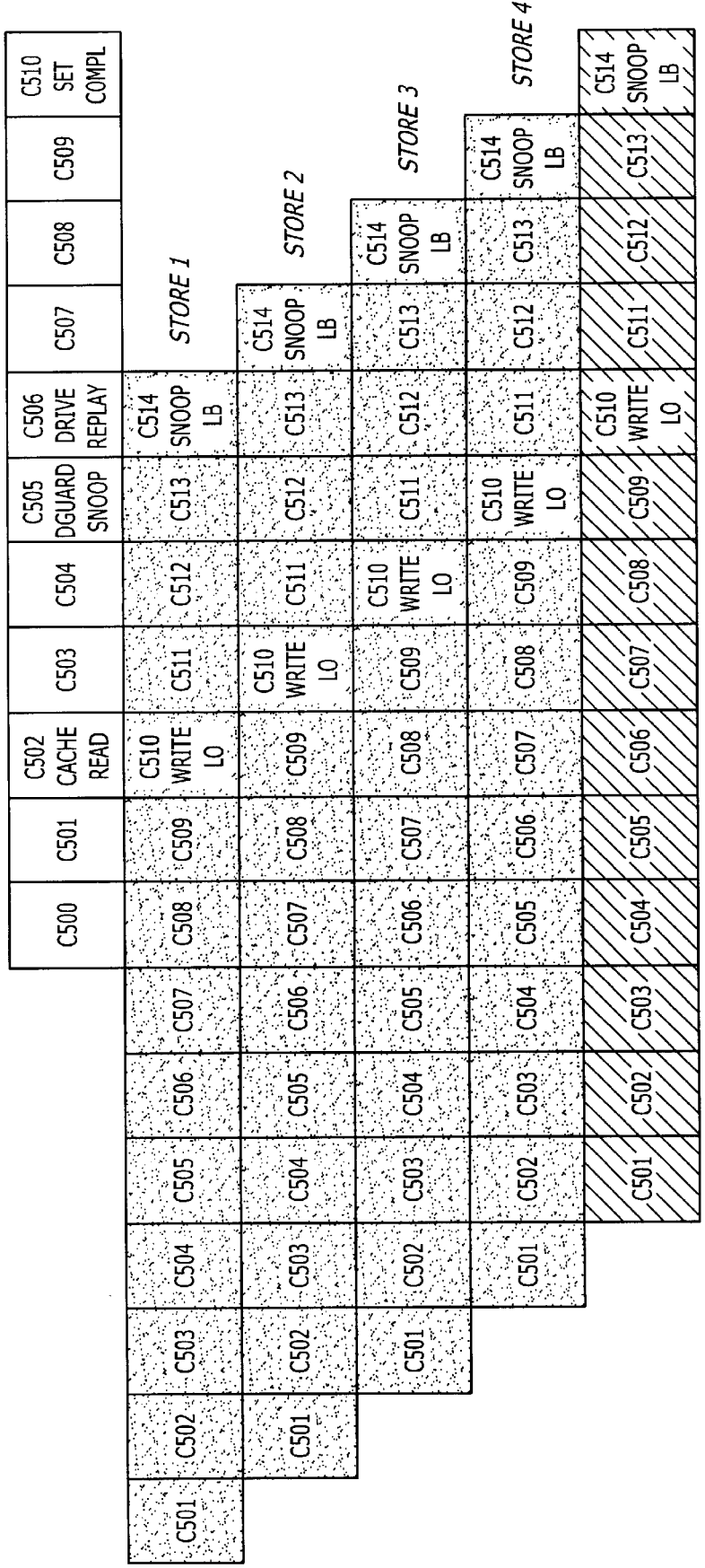
FIG. 7 shows an example of a timing diagram illustrating an additional problem with processor ordering.

The following section describes an additional problem with processor ordering that is not addressed by the ordering mechanism described above. The ordering mechanism which performs either a cross-thread snooping operation or an external snooping operation to check for a match between an address of a store instruction being executed and addresses in the load buffer works fine as long as each load instruction that has been bound to data is visible to the snooping logic at the time the snooping operation is performed. However, due to a time delay between the time when a load UOP is bound to data and the time when the snooping operation (either cross thread or external snoop) is performed, there could be potentially some load UOPs that have been bound to data in the load pipeline but are not visible to the snooping logic. In other words, the ordering mechanism described above has some blind spot during which loads are not guarded against processor ordering violation. FIG. 7 shows an example of a timing diagram which illustrates the additional problem due to the timing delay explained above. It should be appreciated and understood by one skilled in the art that the timing example shown in FIG. 7 is for illustrative purposes only and does not in anyway limit the scope of the present invention. The timing when a particular load gets bound to data and the timing when the load buffer is snooped may be varied depending on different implementations and/or applications. As shown in FIG. 7, the snooping of the load buffer to enforce processor ordering occurs in cycle 514 of the memory store pipeline. However, loads get bound to data in the forwarding store data buffer (FSDB) 521 in cycle 502 of the memory load pipeline. Therefore, when an external snooping or a cross-thread snooping operation is performed to snoop the load buffer, there could be potentially up to four loads in the load pipeline that have been bound to data but are not visible to the snooping logic. Consequently, there could be up to four stores in that time frame between cycle 502 of the load pipeline and cycle 514 of the store pipeline. As such, a load in the shadow of these four stores will not be protected against processor ordering by the ordering mechanism described above. The description that follows describes the solution to this additional problem with processor ordering.

Figure 8:
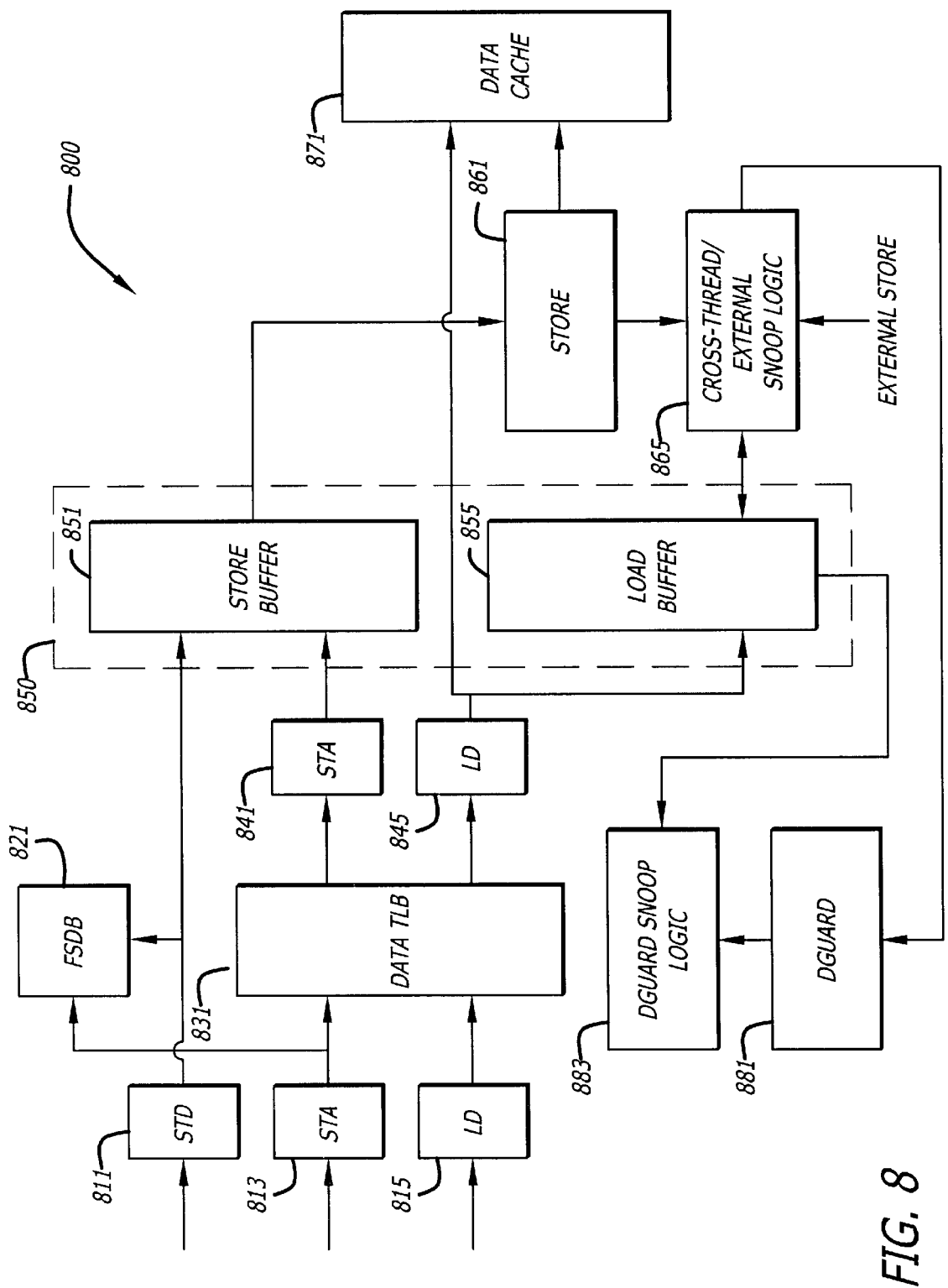
FIG. 8 illustrates a block diagram of another embodiment of a memory execution unit according to the teachings of the present invention.

FIG. 8 shows a block diagram of one embodiment of a memory execution unit that includes a mechanism to solve the problem just described above. In order to guard loads that have been bound to data but not visible to the snooping logic against processor ordering violation, these loads need to be guarded against conflict with stores that happen during that gap. Specifically, stores that happen during that gap need to be kept tracked of and a load being executed later needs to be checked against these stores. If the address of the load being executed matches one of the addresses that took place during the gap mentioned above then that particular load needs to be replayed or re-executed to avoid processor ordering violation.

As described above with respect to FIG. 5, the memory execution unit 800 shown in FIG. 8 is responsible for servicing various types of memory access instructions (UOPs) including read (load) and write (store) instructions and for enforcing processor ordering with respect to these various memory access instructions. As shown in FIG. 8, the memory execution unit 800 includes a memory order buffer (MOB) 850 that is used to control the memory dispatching within the memory execution unit 800. The MOB 850, in one embodiment, includes a store buffer 851 and a load buffer 855 that are used to store the STORE and LOAD UOPs that are dispatched from the scheduler/dispatcher unit 442. The memory execution unit 800 further includes a data translation look-aside buffer (DLTB) 831 that is used to translate the linear addresses of the load and store UOPs into physical addresses. The memory execution unit 800 also includes a data cache unit (also referred to as level 0 or L0 data cache) 871. In one embodiment, the memory execution unit 800 further includes a page miss handler (PMH) (not shown). As shown in FIG. 8, the memory execution unit 800 also includes a forwarding store data buffer (FSDB) 821. The memory execution unit 800 further includes a ordering mechanism (logic) 865. The function(s) and structure of these units are described above with respect to FIG. 5.

However, the memory execution unit 800 also includes a data structure 881 (also referred to as the data ordering guard or DGUARD) that is used to keep track of the stores that happen between the time when a load instruction gets bound to data and the time when the cross-thread or external snoop is performed (also referred to as the "gap" or the "window of vulnerability"). For explanation and illustration purposes only, it is assumed that the "gap" or "window" of vulnerability is four processing cycles in the present embodiment. That "gap" or "window" of course can be different in other embodiments or implementations. The teachings of the present invention should not be restricted to any particular timing requirements and should be applicable to other embodiments, implementations, and applications where processor or memory ordering is to be enforced. In the present embodiment, the data structure 881 can be a free-running stack that is used to maintain the physical address and other pertinent information of the store instructions or operations dispatched during the last four cycles. Accordingly, the data structure 881 may contain 4 entries. As described above, the store instructions can be either internal full-stores dispatched within the memory execution unit 800 or external stores from another agent (e.g., a second processor). To enforce processor ordering against the "gap" or "window of vulnerability", the memory execution unit 800 further includes a snooping mechanism or logic 883. In the present embodiment, in response to a load UOP being executed, the logic 883 compares the address of the load UOP being executed with the addresses in the data structure 881. If a match is detected, the respective load is replayed or re-executed to avoid processor ordering violation. In one embodiment, once a match is detected, the logic 883 can request a replay of the respective load UOP by sending an appropriate request or signal to a checker and replay unit (not shown) in order to replay or re-execute the respective load. With respect to the timing example shown in FIG. 7, in cycle 505 of the load pipeline, the physical address of the load UOP being executed is compared with the physical address of qualified entries in the data structure 881. In one embodiment, in MT mode, the qualified entries include all cross-thread full stores and external snoops dispatched during the last four cycles. In single threaded (ST) mode, the qualified entries include all external snoops. In one embodiment, the full stores include MOB dispatched full stores as well as the PMH dispatched split-stores. In one embodiment, the matching is done on a cache line granularity. If a match is detected then the respective load is replayed to avoid processor ordering violation.

Figure 9:
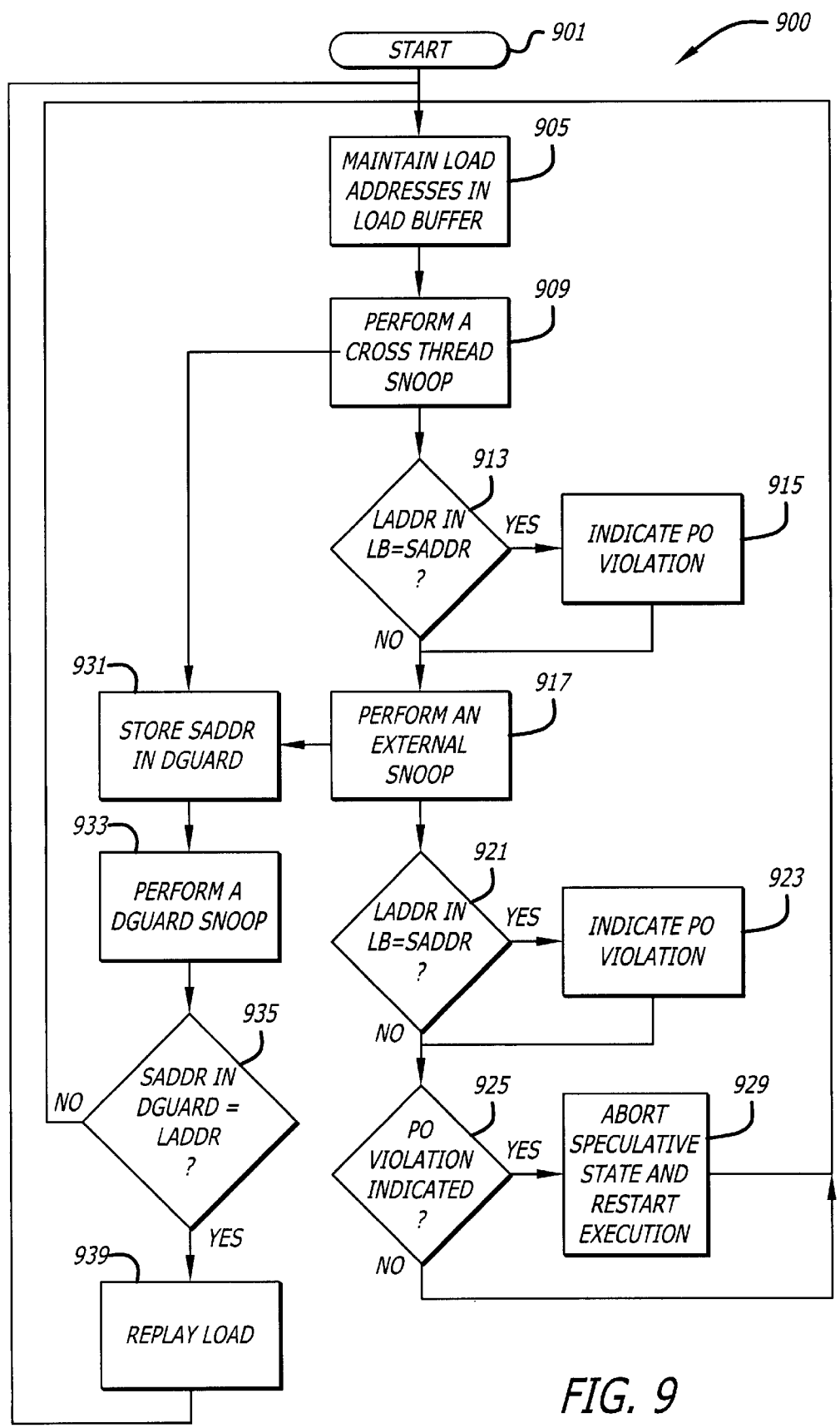
FIG. 9 shows a flow diagram of one embodiment of a method for maintaining processor ordering according to the teachings of the present invention.

FIG. 9 shows a flow diagram of one embodiment of a method 900 for maintaining processor ordering according to the teachings of the present invention. The method 900 starts at block 901 and proceeds to block 905. At block 905, load addresses and other pertinent information of load UOPs that have been dispatched but not yet retired are maintained in a load buffer of a first processor. As described above, an entry in the load buffer is allocated for each UOP dispatched from the scheduler/dispatcher. As the load UOP proceeds through the pipeline of the first processor, other relevant information with respect to the load UOP is also updated accordingly in the load buffer. For example, a load buffer entry allocated for a dispatched load UOP also includes a status field that is used to indicate whether the respective load UOP has been bound to data, whether the respective UOP has been completed or being replayed, etc. At block 909, in response to a full store dispatch from one thread (as shown in FIG. 8), a cross-thread snooping operation is performed to compare the address of the full store dispatch from one thread to load addresses of the load UOPs from the other thread that have been completed but not yet retired. At decision block 913, if a match is found, the method 900 proceeds to block 915 to indicate a processor ordering violation (i.e., a snoop hit). Otherwise, the method 900 proceeds to block 917. The method also proceeds from block 909 to block 931 to store the address of the full store dispatch in the data structure 881 shown in FIG. 8. At block 917, in response to an external store instruction being detected on the bus (e.g., a store instruction from a second processor), an external snooping operation is performed to compare the address of the external store instruction to addresses of all load UOPs in the load buffer that have been completed but not yet retired. At decision block 921, if a match is found, the method 900 proceeds to block 923 to indicate a processor ordering violation (i.e., a snoop hit). Otherwise, the method 900 proceeds to block 925. The method 900 also proceeds from block 917 to block 931 to store the address of the external store dispatch in the data structure 881. At decision block 925, the method 900 proceeds to block 929 if a processor ordering violation has been indicated. Otherwise the method 900 loops back to block 905. At block 929, the speculative state of the first processor is aborted and the first processor is restarted from the respective load for which the snoop hit is indicated. As illustrated in FIG. 9, the method 900 also proceeds from block 931 to block 933. At block 933, in response to a load UOP being executed, the snoop logic 883 snoops the data structure 881 to compare the address of the load being executed with the addresses stored in the data structure 881. At decision block 935, if there is a match, the respective load is replayed at block 939. Otherwise, the method 900 loops back to block 905.

Figure 10:
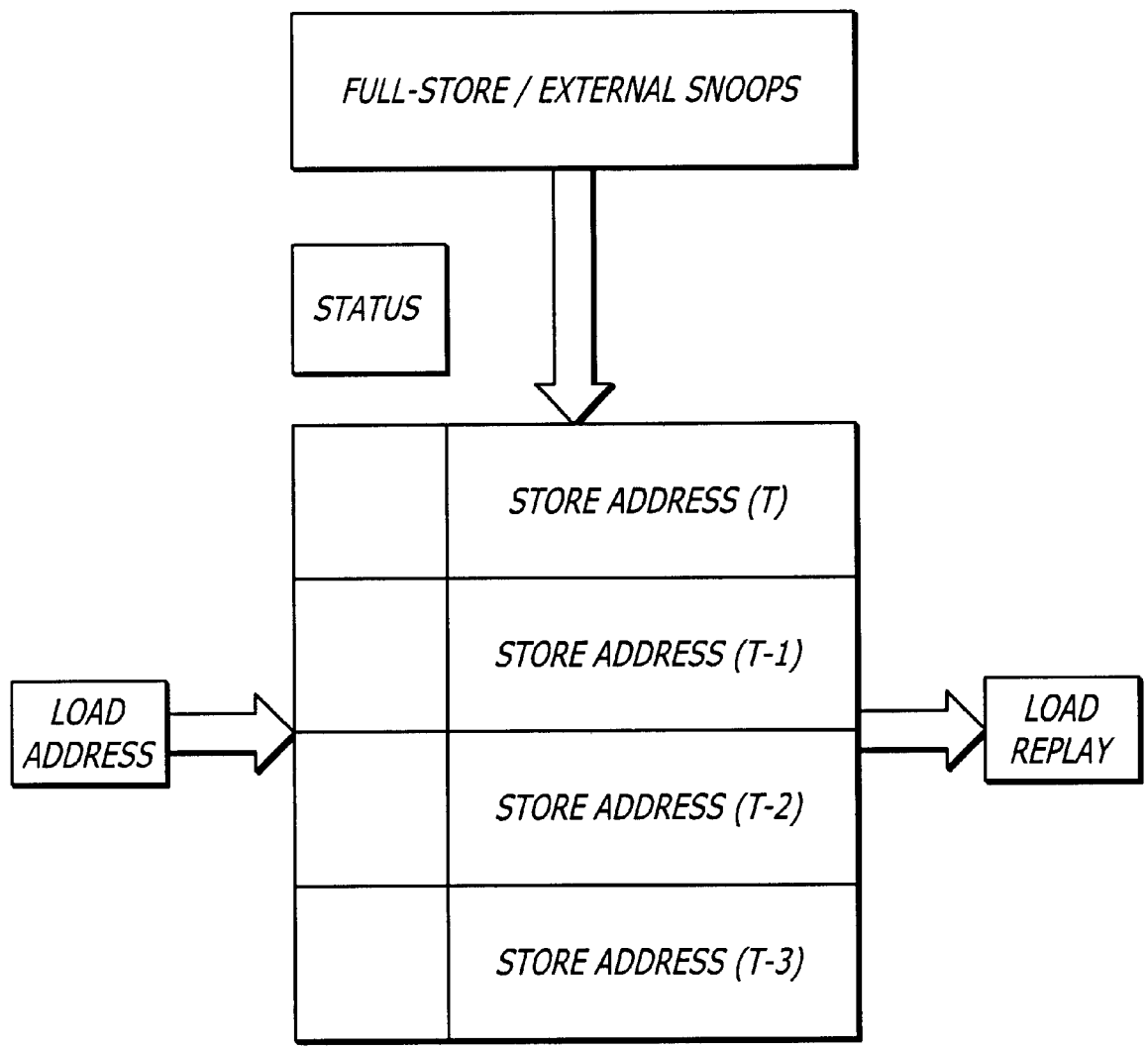
FIG. 10 illustrates a block diagram of one embodiment of a data structure in accordance with the teachings of the present invention.

FIG. 10 illustrates a block diagram of one embodiment 1000 of the data structure 881 shown in FIG. 8. In this embodiment, the data structure 881 contains four entries that are used to maintain the physical address and other pertinent information of full-stores and external stores dispatched during the last four cycles. In this embodiment, the data structure 881 is configured as a free-running stack. As illustrated in FIG. 10, each time a cross thread snoop operation or an external snoop operation is performed by the cross-thread/external snoop logic 865, the physical address and other pertinent information associated with the respective store operation (e.g., either a full-store or an external store) are stored as an entry in the data structure 881. Accordingly, there can be up to four store entries in the data structure 881 at any given time. As described above, the load address of a load UOP being executed is compared with the addresses stored in the data structure 881. If there is a match, the respective load is replayed to avoid processor ordering violation.

Figure 11:
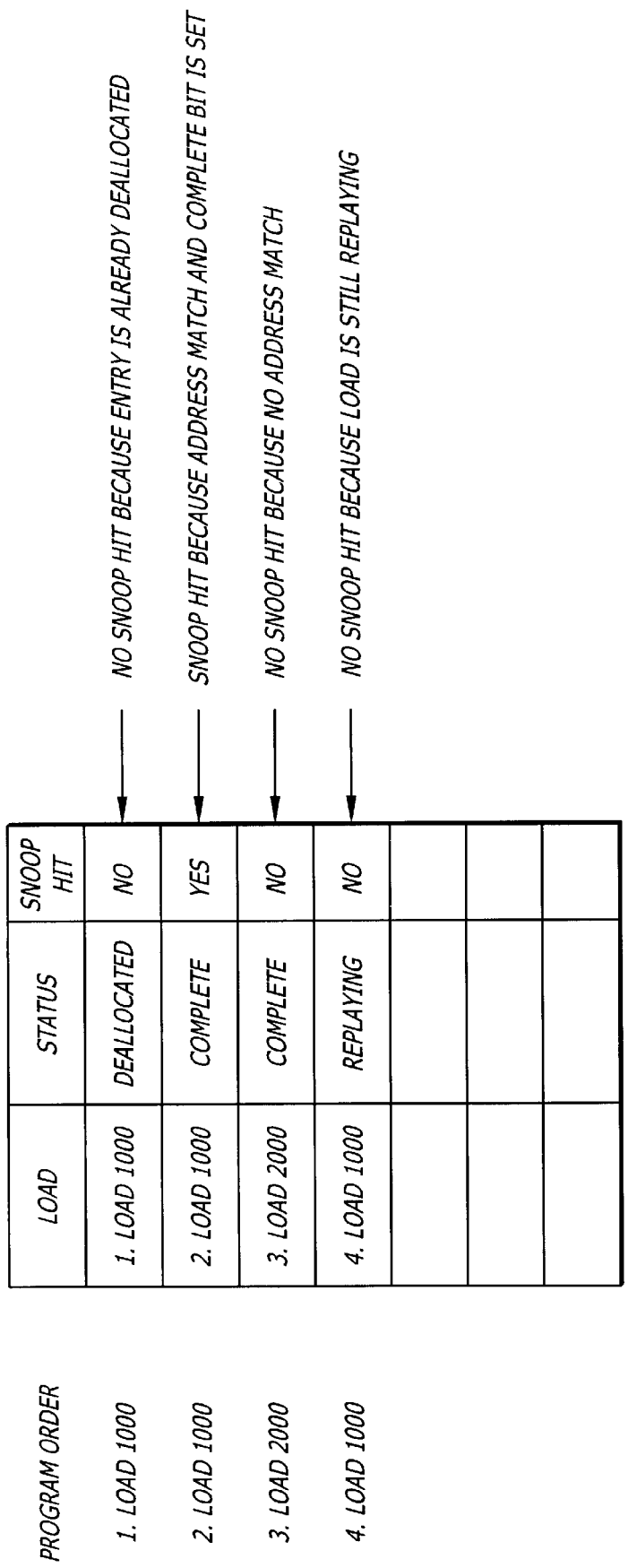
FIG. 11 is an example of a load buffer containing multiple load entries with various statuses.

FIG. 11 illustrates an example of the operation of the load buffer 555 in FIG. 5 or 855 in FIG. 8. In this example, it is assumed that the load buffer contains four entries with various statuses at the time the cross thread or external snooping operation is performed. It is also assumed that the address of the store operation is 1000. Based upon the address and status of each load entry in the load buffer, the result of the snooping operation is also shown in FIG. 11. With respect to entry #1, there is no snoop hit because the corresponding entry is already deallocated when the snooping operation is performed. For entry #2, there is no snoop hit because the address of the store and the address of the load corresponding to entry #2 do not match. With respect to entry #4, there is no snoop hit because the load status indicates that the corresponding load is still replaying. For entry #2, there is a snoop hit because the address of the store and the address of the load match and the status bit indicates that the load has completed. Accordingly, the snoop hit field is set to indicate a snoop hit for load entry #2.

The invention has been described in conjunction with the preferred embodiment. It is evident that numerous alternatives, modifications, variations and uses will be apparent to those skilled in the art in light of the foregoing description.

What is claimed is:

1. A method comprising:

maintaining store addresses of store instructions dispatched during a last predetermined number of cycles in a first data structure of a first processor;

determining whether a load address of a first load instruction matches one of the store addresses in the first data structure; and replaying the first load instruction if the load address of the first load instruction matches one of the store addresses in the first data structure.

2. The method of claim 1 further comprising:

snooping a load buffer containing load addresses of load instructions that have not been retired to determine whether an address of a store instruction matches one of the load addresses in the load buffer; and aborting a speculative state of the first processor if the address of the store instruction matches one of the load addresses in the load buffer.

3. The method of claim 1 wherein maintaining store addresses comprises:

storing a store address associated with a cross-thread snooping operation performed in response to a full-store dispatch from one thread.

4. The method of claim 1 wherein maintaining store addresses comprises:

storing a store address associated with an external snooping operation performed in response to a store operation being executed by a second processor.

5. The method of claim 1 wherein determining comprises:

obtaining the load address of the first load instruction; and comparing the load address of the first load instruction against the store addresses in the first data structure.

6. The method of claim 2 wherein aborting comprises:

aborting a load operation whose address in the load buffer matches the address of the store instruction and speculatively processed operations following said load operation; and reissuing the aborted operations from said load operation.

7. A method comprising:

maintaining load addresses of load instructions that have not been retired in a load buffer of a first processor;

snooping the load buffer to determine whether a store address associated with a store instruction matches one of the load addresses in the load buffer of the first processor;

aborting a speculative state of the first processor in response to a match between the store address associated with the store instruction and one of the load addresses in the load buffer;

storing the store address associated with the store instruction in a first data structure; and replaying a load instruction whose load address matches one of the store addresses in the first data structure.

8. A method comprising:

storing addresses of dispatched load operations that have not been retired in a load buffer of a first processor;

storing addresses of dispatched store instructions in a first data structure;

aborting a speculative state of the first processor in response to a match detected between an address of a first store instruction and an address in the load buffer; and replaying a first load instruction in response to a match detected between an address of a first load instruction and an address in the first data structure.

9. A method comprising:

maintaining addresses of load operations associated with first and second threads in a load buffer of a first processor;

in response to a first store operation, snooping the load buffer of the first processor to determine whether there is a match between an address of the first store operation and one of the addresses in the load buffer;

in response to a match between the address of the first store operation and one of the addresses in the load buffer, aborting a first load operation whose address matches the address of the first store operation and speculatively processed operations following the first load operation;

storing the address of the first store operation in a first data structure;

determining whether an address of a second load operation matches one of the addresses stored in the first data structure; and replaying the second load operation in response to a match between the address of the second load operation and one of the addresses stored in the first data structure.

10. The method of claim 9 wherein the first processor executes the first thread and the second thread concurrently, and wherein the snooping of the load buffer comprises:

if the first store operation is from the first thread, performing a cross-thread snooping of the load buffer; and if the first store operation is from a second processor, performing an external snooping of the load buffer.

11. The method of claim 10 wherein performing the cross-thread snooping comprises:

comparing the address of the first store operation with the addresses in the load buffer that are associated with the second thread.

12. The method of claim 10 wherein performing the external snooping comprises:

comparing the address of the first store operation with addresses in the load buffer that are associated with both first and second threads.

13. A method comprising:

storing load addresses of dispatched load operations that have not been retired in a load buffer of a first processor;

in response to a store operation being dispatched, snooping the load buffer to determine whether there is a match between a load address in the load buffer and an address of the store operation;

storing the address of the store operation in a data structure; and in response to a load operation being executed, snooping the data structure to determine whether an address of the load operation matches a store address in the data structure.

14. An apparatus in a first processor comprising:

a load buffer to store addresses of issued load instructions that have not been retired;

a first data structure to store addresses of a predetermined number of issued store instructions; and an ordering mechanism to maintain processor ordering by comparing an address of a first store instruction with addresses in the load buffer and comparing an address of a first load instruction with addresses in the first data structure, the ordering mechanism to cause a speculative state of the first processor to be aborted in response to a match between the address of the first store instruction and an address in the load buffer, and the ordering mechanism to cause the first load instruction to be replayed in response to a match between the address of the first load instruction and an address in the first data structure.

15. The apparatus of claim 14 wherein the ordering mechanism comprises:

a first detect logic to detect the address of the first store instruction; and a first compare logic to compare the address of the first store instruction with addresses in the load buffer to determine whether there is a match between the address of the first store instruction and one of the addresses in the load buffer.

16. The apparatus of claim 15 wherein the first store instruction comes from one of two threads being executed by the first processor.

17. The apparatus of claim 15 wherein the first store instruction comes from an agent.

18. The apparatus of claim 17 wherein the agent comprises a second processor.

19. The apparatus of claim 15 further comprising:

first store logic to store the address of the first store instruction in the first data structure; and second compare logic to compare the address of the first load instruction with the addresses in the first data structure.

20. A system comprising:

a first processor being capable of executing a first thread and a second thread concurrently;

a bus coupled to the first processor;

an agent coupled to the bus, the first processor and the agent sharing a common memory; and an ordering mechanism to maintain memory ordering by comparing an address of a first store instruction with addresses of load instructions that have been dispatched but have not yet been retired by the first processor and comparing an address of a first load instruction with addresses of a predetermined number of store instructions that have been dispatched by the first processor or by the agent, the ordering mechanism to cause a speculative state of the first processor to be aborted in response to a match between the address of the first store instruction and one of the addresses of the load instructions, and the ordering mechanism to cause the first load instruction to be replayed in response to a match between the address of the first load instruction and one of the addresses of the store instructions.

21. The system of claim 20 wherein the agent comprises a second processor.

22. The system of claim 20 wherein the addresses of the load instructions are stored in a load buffer.

23. The system of claim 20 wherein the addresses of the store instructions are stored in a first data structure.

24. The system of claim 20 wherein the addresses of the store instructions are obtained by a first snoop logic that snoops the bus for addresses of store instructions dispatched by the agent.

25. The system of claim 20 wherein the addresses of the store instructions are obtained by a second snoop logic that snoops for addresses of full-store instructions dispatched by either thread in the first processor.

26. The system of claim 20 wherein the first store instruction comprises a store instruction dispatched from one of the two threads in the first processor.

27. The system of claim 26 wherein the ordering mechanism compares the address of the first store instruction associated with one thread with addresses of load instructions associated with the other thread.

28. The system of claim 20 wherein the first store instruction comprises a store instruction dispatched from the agent.

29. The system of claim 28 wherein the ordering mechanism compares the address of the first store instruction from the agent with addresses of load instructions associated with the first and second threads.

30. A first processor comprising:

an execution core that executes instructions from a first thread and a second thread of the first processor; and a memory unit comprising:
    a load buffer that stores addresses of load instructions from the first and second threads that have been issued but not yet retired;
    first order logic to snoop the load buffer for a match between an address of a completed load instruction and an address of a first store instruction, the first order logic causes the completed load instruction to be cleared and reissued in response to the match between the address of the completed instruction and the address of the first store instruction, the address of the first store instruction being stored in a first data structure; and
    second snoop logic to snoop the first data structure for a match between an address of a first load instruction being executed and one of the addresses in the first data structure, the second snoop logic causes the first load instruction to be replayed in response to the match between the address of the first load instruction and one of the addresses in the first data structure.

\* \* \* \* \*

UNITED STATES PATENT AND TRADEMARK OFFICE
CERTIFICATE OF CORRECTION

PATENT NO. : 6,484,254 B1  Page 1 of 1
DATED : November 19, 2002
INVENTOR(S) : Chowdhury et al.

It is certified that error appears in the above-identified patent and that said Letters Patent is hereby corrected as shown below:

<u>Column 2,</u>
Line 37, delete "100 X", insert -- 1000 X --.

Signed and Sealed this

Twenty-fourth Day of June, 2003

JAMES E. ROGAN
*Director of the United States Patent and Trademark Office*